(12) United States Patent
Manlove et al.

(10) Patent No.: US 7,682,478 B1
(45) Date of Patent: Mar. 23, 2010

(54) VACUUM INFUSION LAMINATE ADHESIVE

(75) Inventors: Jim Manlove, Port Orchard, WA (US); David Carnahan, Bremerton, WA (US)

(73) Assignee: Westech Aerosol Corp., Port Orchard, WA (US)

( * ) Notice: Subject to any disclaimer, the term of this patent is extended or adjusted under 35 U.S.C. 154(b) by 767 days.

(21) Appl. No.: 11/062,502

(22) Filed: Feb. 22, 2005

Related U.S. Application Data

(60) Provisional application No. 60/547,253, filed on Feb. 24, 2004.

(51) Int. Cl.
*B29C 65/00* (2006.01)
*B29C 47/76* (2006.01)
*C04B 37/00* (2006.01)

(52) U.S. Cl. .................. 156/285; 156/286; 156/325; 264/101; 264/102

(58) Field of Classification Search .............. 156/285, 156/286, 325; 264/101, 102
See application file for complete search history.

(56) References Cited

U.S. PATENT DOCUMENTS

| | | | | |
|---|---|---|---|---|
| 5,380,552 A | * | 1/1995 | George et al. | 427/186 |
| 6,216,752 B1 | * | 4/2001 | Bailey | 141/236 |
| 6,723,273 B2 | * | 4/2004 | Johnson et al. | 264/510 |
| 2002/0016420 A1 | * | 2/2002 | Zarnoch et al. | 525/418 |
| 2003/0090027 A1 | * | 5/2003 | Smirnova et al. | 264/177.11 |

OTHER PUBLICATIONS http://web.archive/web/20031115182806/http://fibreglast.com/documents/361.pdf Published Nov. 15, 2003.*

* cited by examiner

*Primary Examiner*—Philip C Tucker
*Assistant Examiner*—Michael N Orlando
(74) *Attorney, Agent, or Firm*—Innovative IP, LLC; Sandra M. Sovinski

(57) ABSTRACT

A vacuum infusion laminate adhesive that holds the laminate layers together as the catalyzed resin is sucked into a laminate structure. The adhesive includes properties that cross-link with polyester present in the laminate structure as it cures. Generally, the laminate layers include the assembly of polyester or vinyl ester resins that are reinforced with fiberglass.

9 Claims, 2 Drawing Sheets

VACUUM INFUSION LAMINATE ADHESIVE

Priority based on U.S. Provisional Patent Application Ser. No. 60/547,253, filed on Feb. 24, 2004, and entitled "Vacuum Infusion Laminate Adhesive", is claimed.

BACKGROUND

I. Field of the Invention

The present invention relates generally to the field vacuum infusion and more particularly to a vacuum infusion laminate adhesive.

II. Description of the Related Art

Vacuum infusion is a process in which fiberglass and foam core laminates are prepared and enclosed in a vacuum bag. Catalyzed resin is then infused into the vacuum. This process has the advantage of reducing material loss and eliminating a large source of air pollution. Many spray adhesives that are used to hold the laminates together during this process form an interface that is generally weaker than the rest of the structure, which can result in premature failure of the structure where the adhesive was used. In general, currently, spray adhesives are used to hold the layers of dry materials together during the curing process of the resins. As mentioned above, this method is problematic because it compromises the integrity of the materials, weakening the structure as a whole.

SUMMARY

In general, the invention features a vacuum infusion laminate adhesive that holds the laminate layers together as the catalyzed resin is sucked into a laminate structure. The adhesive includes properties that cross-link with polyester present in the laminate structure as it cures. Generally, the laminate layers include the assembly of polyester or vinyl ester resins that are reinforced with fiberglass. Dry materials are held together onto structural surfaces, curing with the resins, resulting in one uninterrupted formation. The adhesive (polymeric spray) does not interfere with the curing process of vinyl esters, polyester or styrene resins. In fact, the adhesive cross links and hardens along with the ester or styrene to form a single integrated structure.

In general, in one aspect, the invention features a cross linking adhesive composition, comprising a mix of reactive SBS block co-polymer, hydrocarbon tackifying resin, cyclohexane and acetone.

In one implementation, the SBS block co-polymer comprises a chain of polystyrene and butadiene groups.

In another implementation, the butadiene group includes a midblock.

In another implementation, the midblock is for cross linking with added vacuum infusion styrene.

In another implementation, the midblock is for cross linking with added vacuum infusion resins.

In another aspect, the invention features a laminate structure, including a core layer having a first surface and a second surface, a cross-linking adhesive coated on at least one of the surfaces and a fiberglass layer in contact with at least one surface containing the adhesive, wherein the adhesive includes a mix having reactive SBS block co-polymer, hydrocarbon tackifying resin, cyclohexane and acetone.

In one implementation, the laminate structure further includes a resin coating the layers.

In another implementation, the laminate structure further includes a catalyst.

In another implementation, the SBS block co-polymers include a midblock that cross links with the resin.

In another aspect, the invention features a vacuum infusion process, including preparing a laminate structure, having a core layer having a first surface and a second surface, a cross-linking adhesive coated on at least one of the surfaces and a fiberglass layer in contact with at least one surface containing the adhesive, wherein the adhesive includes a mix having reactive SBS block co-polymer, hydrocarbon tackifying resin, cyclohexane and acetone and catalyzing a resin and placing the resin along with the laminate structure within a vacuum bag.

In one implementation, the SBS block co-polymer contains double bonds in a butadiene block.

In another implementation, the resin is a polyester chain.

In another implementation, the double bonds cross-link with the polyester chain In another implementation, the cross linking reaction is free-radical initiated.

In another implementation, the free-radical initiated reaction is a polymerization reaction that yields alternating styrene-polyester molecules.

In still another implementation, the styrene-polyester molecules incorporate the SBS block co-polymers to form a polymer matrix incorporating the adhesive into the matrix.

In another implementation, the matrix has the form:

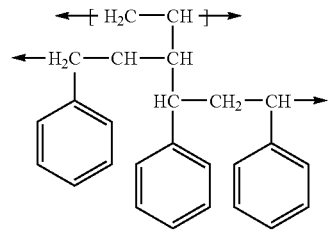

In yet another implementation, the adhesive layer first dissolves the polyester-styrene mixture then polymerizes along with the polyester under the influence of an organic peroxide catalyst.

In another implementation, the process further includes initiating a catalyst system for a vinyl ester resin.

In another implementation, the catalyst system is cumene hydroperoxide.

One advantage of the invention is that material loss is reduced.

Another advantage of the invention is that the process fuses laminating materials to structural core surfaces with low shrinkage during curing steps.

Another advantage of the invention is that polluting emissions are reduced.

Another advantage of the invention is that a superior interface between laminate layers is formed.

Another advantage of the invention is that the process and the resin embodiments provide superior holding during forming processes.

Another advantage of the invention is that the process allows embodiments of the resin to obtain maximum tensile sheer strength.

Other objects, advantages and capabilities of the invention will become apparent from the following description taken in conjunction with the accompanying drawings showing the preferred embodiment of the invention.

DETAILED DESCRIPTION

Figure 1:
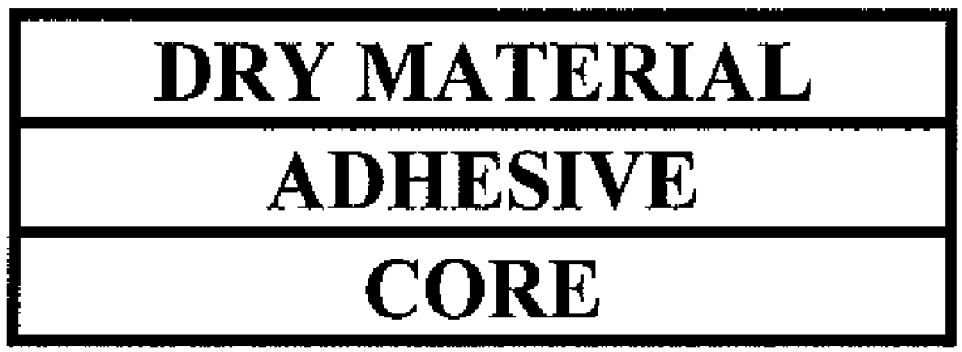
FIG. 1 illustrates typical layers implemented in a typical embodiment of the process.

In general, the invention features a vacuum infusion laminate adhesive that holds the laminate layers together as the catalyzed resin is sucked into a laminate structure. The adhesive includes properties that cross-link with polyester present in the laminate structure as it cures. Generally, the laminate layers include the assembly of polyester or vinyl ester resins that are reinforced with fiberglass. Present infusion molding used to fabricate fiberglass resin polyester (FRP) structures such as marine hulls is improved with the use of embodiments of the laminate composition and methods described herein. The present technique encapsulates the fiberglass, foam core and vinyl ester resins while the resin cures, resulting in a superior product and reducing substantially styrene emissions that is typical of other processes. This process typically requires the use of an adhesive to hold the components in place while the laminate is bagged and infused with resin under vacuum. The cross linkable laminate adhesive composition and method embodiments create strong point connections between the layers. The adhesive bonds with the vinyl ester-styrene resin and becomes an integral part of the structure as discussed further in the description below. During curing, low shrinkage is observed. Furthermore, the adhesive composition allows the resin to obtain its maximum tensile sheer strength.

In a typical embodiment, the adhesive is enclosed in a spray can and is used to hold dry materials onto the structural surfaces, ultimately curing with the resins, resulting in one uninterrupted formation. The polymeric spray does not interfere with the curing process of vinyl esters, polyester or styrene resins. The adhesive ultimately cross links and hardens along with the ester or styrene to form an integrated structure.

It is understood that the composition can be enclosed in a canister and other suitable containers.

In a typical implementation, the adhesive is prepared by dissolving a SBS co-polymer (rubber) and tackifying resin in a mixture of acetone and cyclohexane. The solvents form a solution of the rubber and resin of moderate viscosity. The higher the concentration in terms of the weight percent solids (rubber plus resin) to the total weight of the mix, the higher the viscosity. When the composition is delivered in a spray can, the adhesive is typically formulated with a lower viscosity so that when placed in the spray can and pressurized with hydrocarbon gas (typically a mix of propane and isobutane), the adhesive sprays satisfactorily. In another embodiment, when the composition is packaged in a canister, a smaller amount of the propane-isobutane mixture is used and pressurized with nitrogen or other suitable gas to a higher pressure. This embodiment permits a higher viscosity in the mix and therefore a higher solids level in the basic composition. The typical difference between spray cans and canisters is primarily a matter of pressure since cans cannot withstand high pressures.

Typical constituent ingredients of the adhesive are reactive SBS block co-polymer, hydrocarbon tackifying resin, cyclohexane and acetone. In addition, in other embodiments, catalysts such as organic peroxide and cumene hydroperoxide can be implemented.

In a typical reaction where cross linking of the adhesive occurs with the polyester or other material occurs, the reactive SBS block co-polymer contains double bonds in the butadiene block. The double bonds are available for cross-linking with other polymers and monomers in free-radical initiated reactions such as the polymerization reactions that occurs between polyester resin and styrene. This reaction, which yields alternating styrene-polyester molecules in the normal process of forming the polymer, typically also incorporate SBS block co-polymer in the chain. This reaction has the effect of making the adhesive become part of the polymer matrix instead of a separate layer if it did not participate in the reaction. For this to occur, the adhesive layer first dissolves the polyester-styrene mixture, then polymerizes along with the polyester under the influence of an organic peroxide catalyst. In another embodiment, the catalyst system that is typically desired for the vinyl ester resin (the polyester) is cumene hydroperoxide.

FIG. 1 illustrates typical layers implemented in a typical embodiment of the process. As mentioned above, the layers can include a grooved and perforated core material, fiberglass roving and fiberglass mat materials held together with embodiments of the adhesive spray.

Figure 2:
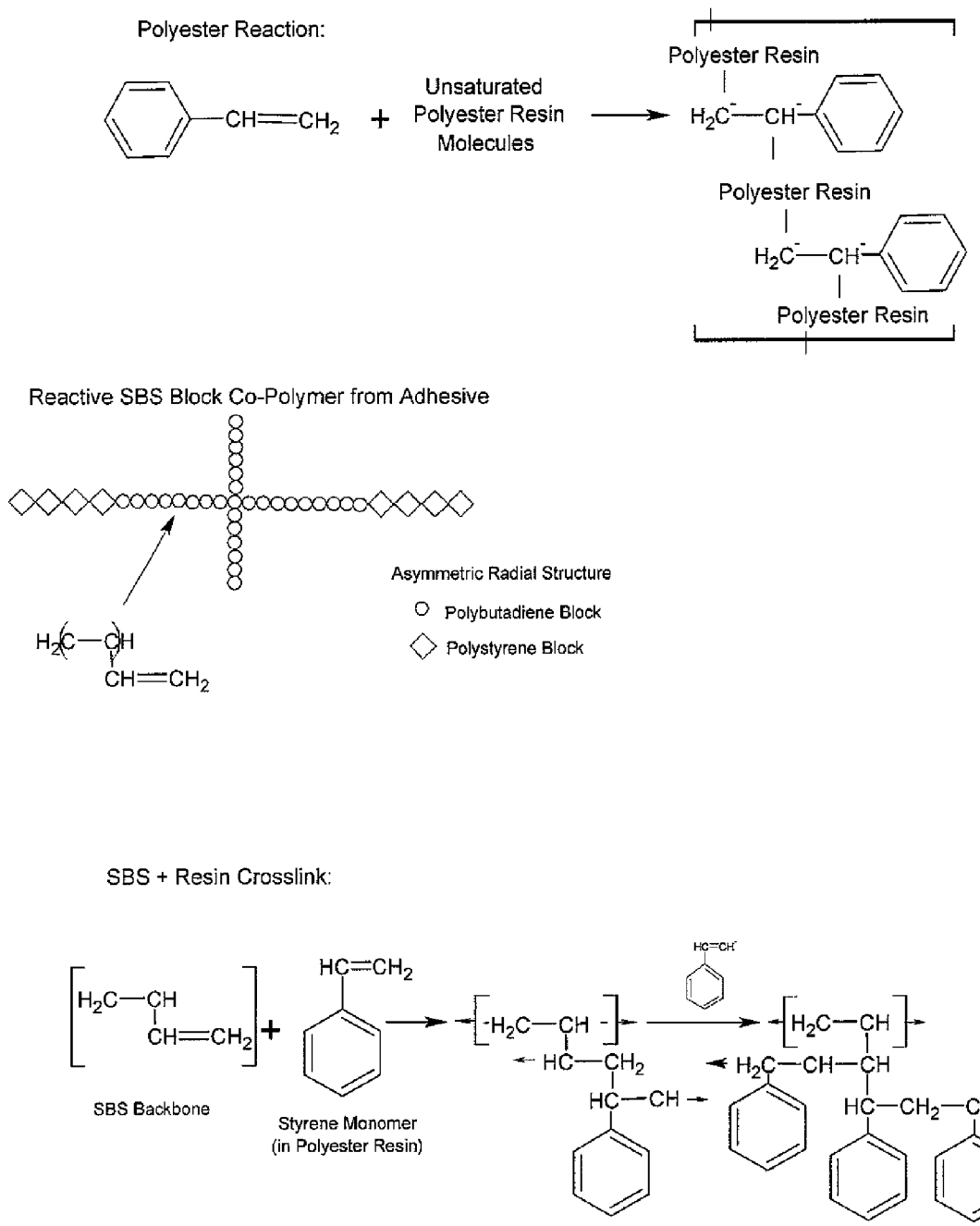
FIG. 2 illustrates an embodiment of typical cross-linking reactions.

FIG. 2 illustrates an embodiment of typical cross-linking reactions. The figure illustrates probable chemical reactions between embodiments of the adhesive and the resins or styrene as discussed above. The figure illustrates a polyester reaction, the reactive SBS block co-polymers from embodiments of the adhesive and the most likely reactions of the SBS, styrene and polyester resin. In one embodiment, the reaction is styrene to the butadiene midblock. In another embodiment, the resin cross links as well.

In a typical embodiment, composites are prepared from grooved and perforated foamed core material, fiberglass roving and fiberglass mat materials that are held together with a the cross linking adhesive. These composites are then vacuum infused with vinyl ester resin. After curing, typical testing using ASTM D987-78 was implemented. There are typically no weak spots detected in the composited using the adhesive.

EXAMPLE

In order to test the efficacy of the composition, laminate samples are prepared following a procedure similar to ASTM D 897. A typical boat laminate representing a boat hull cross section is used. Samples of foam core, fiberglass woven roving and fiberglass mat are used. The foam core is typically ¾ inches thick, closed cell polyurethane foam core, scored and perforated for resin infusion. Two types of woven roving are used with random strand fiberglass mat. The laminate structure used is roving #2415, foam core, mat, roving #1708, and mat.

Laminates are prepared by spraying one side of the roving #2415 and the foam core with an embodiment of the adhesive as described above, and placing them together. The other side of the foam board and the first layer of fiberglass mat are sprayed and placed together. In another embodiment, only one surface can be sprayed. The woven roving #1708 and the second mat are placed with another application of the embodiment of the adhesive to hold them in place. Only one application of the adhesive is used between the roving and the mat. The assembled laminate is left typically overnight to allow residual solvent to evaporate.

Laminates typically measuring 12 inches by 12 inches are placed in a waxed pan, covered with release ply, breather fabric and sealed in a nylon vacuum bag.

Reichhold Hydrex 100HF vinyl ester resin is catalyzed per manufacturer's instructions. The catalyzed resin is drawn into the vacuum bag until the resin is completely filled and saturated the laminate. The source of the resin is cut off when the resin appears at the outlet vacuum tube. The vacuum is left on until the resin cures (about three hours). The laminate is allowed to cure overnight at room temperature.

The laminate is separated from the bag and films and cut into squares measuring 1 13/16 inch square. The outer surface fiberglass is roughened on a disc sander and bonded to a 1 13/16 inch diameter hard wood dowel and laminate sample so that when subjected to a shear test, there is no peel. The epoxy is cured overnight. The samples are placed under tension to failure. The samples are then examined to determine where the laminate failure occurred. A successful test is one in which the failure occurred in the foam. Failure at one of the fiberglass interfaces that had been sprayed with the adhesive indicates a failed bond, implying that the adhesive has encapsulated the polyester and left a weakened layer could lead to premature failure of the laminated structure.

This procedure is repeated with alternate adhesive formulations including standard grade spray adhesives not designed to cross-link with the vinyl ester. Each test incorporates a control in which no adhesive is used in the construction.

The results of the testing indicate that samples that incorporate a standard non-cross-linking adhesive exhibit a significant failure rate. All failures include de-laminations between the fiberglass and the foam core that implied adhesive encapsulation. The samples that employed embodiments of the adhesive described herein all failed in the foam core material, confirming the adhesive's cross-linking properties. There are no de-laminations at the points where the adhesive is applied with the embodiments of the adhesive samples.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A vacuum infusion process, comprising:
preparing a laminate structure, including:
a core layer having a first surface and a second surface;
a cross-linking adhesive coated on at least one of the surfaces; and
a fiberglass layer in contact with said at least one surface containing the adhesive, wherein the adhesive includes a mix having reactive SBS block co-polymer, hydrocarbon tackifying resin, cyclohexane and acetone;
dissolving the adhesive;
catalyzing a resin and placing the resin along with the laminate structure within a vacuum bag,
drawing a vacuum on the bag with a vacuum source; and
infusing the laminate structure and forming a matrix comprising the adhesive, cross-linked and hardened along with said reactive SBS block co-polymer as an integrated structure.

2. The process as claimed in claim 1 wherein the resin is a vinyl ester.

3. The process as claimed in claim 2 wherein the vinyl ester is a polyester.

4. The process as claimed in claim 3 wherein butadiene double bonds of the SBS block co-polymer cross-link with the polyester chain of the resin.

5. The process as claimed in claim 4 wherein the cross linking reaction is free-radical initiated.

6. The process as claimed in claim 1 wherein the matrix has the form:

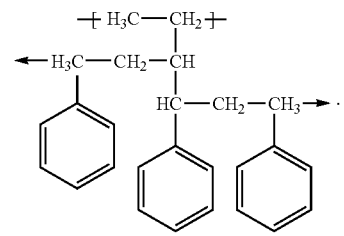

7. The process as claimed in claim 3 wherein the adhesive layer first dissolves in a polyester-styrene mixture before the resin is catalyzed, and then the SBS block co-polymer of the adhesive polymerizes along with the mixture under the influence of an organic peroxide catalyst, resulting in a reduction of styrene emissions.

8. The process as claimed in claim 1 further comprising initiating a catalyst system for a vinyl ester resin before catalyzing the resin.

9. The process as claimed in claim 8 wherein the catalyst system is cumene hydroperoxide.

* * * * *